United States Patent [19]

Lin et al.

[11] Patent Number: 4,974,099
[45] Date of Patent: Nov. 27, 1990

[54] COMMUNICATION SIGNAL COMPRESSION SYSTEM AND METHOD

[75] Inventors: Daniel Lin, Montville; Scott D. Kurtz, Mount Laurel, both of N.J.; Brian M. McCarthy, Lafayette Hill, Pa.; James M. Kresse, Marlton, N.J.

[73] Assignee: International Mobile Machines Corporation, King of Prussia, Pa.

[21] Appl. No.: 369,292

[22] Filed: Jun. 21, 1989

[51] Int. Cl.⁵ .............................................. H04N 1/41
[52] U.S. Cl. ..................................... 358/426; 358/428; 375/122
[58] Field of Search ............... 358/426, 428, 429, 433; 382/56; 341/51; 375/122

[56] References Cited

U.S. PATENT DOCUMENTS

| 4,291,329 | 9/1981 | Ogawa et al. | 358/428 |
| 4,623,922 | 11/1986 | Wischermann | 358/428 |
| 4,783,698 | 11/1988 | Harmey | 358/428 |

FOREIGN PATENT DOCUMENTS

| 0138628 | 12/1978 | Japan | 358/428 |
| 0141525 | 12/1978 | Japan | 358/428 |

OTHER PUBLICATIONS

D. O. Anderson, et al. "Waveform Coding of Voice Band Data Signals at 16 K B/S" IEEE (1987) pp. 1328-1331.

*Primary Examiner*—Edward L. Coles, Sr.
*Attorney, Agent, or Firm*—Arthur A. Jacobs; C. Frederick Koenig, III

[57] ABSTRACT

A telecommunication system and method for communicating communication signals between various stations over a selected carrier medium. An improved encoder and method is provided for compressing a communication signal into a selectively formatted encoded signal to facilitate its transmission over the selected carrier medium. The method is particularly useful for encoding fax and modem data signals which do not exhibit the harmonics of a voice signal. A decoder and method for reconstruction of the encoded signal are also provided.

57 Claims, 4 Drawing Sheets

COMMUNICATION SIGNAL COMPRESSION SYSTEM AND METHOD

The present invention relates to communication systems and in particular to the compression of communication signals to facilitate increased capacity of the communication system.

BACKGROUND OF THE INVENTION

Telecommunication systems are well known in the art. From the seminal work of Samuel Morse, U.S. Pat. No. 1,647 (1840) and Alexander Graham Bell, U.S. Pat. No. 174,465 (1876), an entire industry of telecommunications has developed spanning the globe and beyond.

The encoding of messages as well as timing has played a key role throughout the historical development of communication systems. For example, prior to the invention of the telephone, messages were encoded into Morse Code and corresponding electronic pulses transmitted the encoded message over telegraph lines which would then be received and decoded. Thereafter a response could be communicated reversing the operations. Manual encoding and decoding of messages prohibited the direct real time communications between two persons.

With the advent of the telephone, real time communication was made possible through the electronic encoding of voice patterns into communication signals which signals were carried over wires between two telephones. The speed of the electronic communication signal, which far exceeded the speed of sound, permitted real time voice communication between individuals at substantial distances without significantly perceptible time delay.

Today communication signals are not constrained to wires but are also carried by a microwave, radiowave and optic fibers. These advances have permitted global real time telecommunications. Moreover, real time communication service is expected by the consuming public.

Unlike conventional hard wired telephone systems where a single telephone communication signal is carried on a pair of wires, time division multiplexing has been utilized to increase the capacity of the various carrier mediums. For example, many communication signals can be multiplexed together and carried over a single optic fiber. Accordingly a single optic fiber cable can replace a hundred pair wire cable and provide even greater signal carrying capacity.

The same principle has been employed with respect to radio telephone systems. Radio telephone systems for both stationary and mobile uses are well know in the art. For example, in remote rural areas where installation and maintenance of conventional telephone wire lines is prohibitive, radio telephone systems permit the broadcast between a base and sundry subscriber stations to facilitate telephone service. Mobile radio telephone systems are also becoming increasingly more prevalent in the form of the cellular car phones which have become widely available.

Radio telephone systems utilize a group of selected radio frequencies for carrying the communication signals in lieu of wire cables. A typical stationery radio telephone system may include 13 pairs of selected frequencies or channels over which communication signals are broadcast and received between subscriber stations and a common base station.

Due to the fact that only a limited band of frequencies is permitted for radio telephone usage, time division multiplexing has been employed to permit increased capacity of radio telecommunication systems. For example, U.S. Pat. No. 4,675,863 discloses a stationary radio telephone system which utilizes 26 channel pairs each of which can carry up to four communication signals at one time.

Unlike fiber optic communication transmissions which can speed communication signals to and from their destination in the gigahertz range, carrier radio frequencies (channels) are significantly more limited in their capacity.

In order to increase the capacity of the radio channels, voice signal compression techniques have been utilized. One technique which has proved successful is Residual Excited Linear Predictive coding (RELP) such as disclosed in U.S. patent application No. 667,446, filed Nov. 2, 1984. RELP permits the compression of a 64 kilobits per second voice communication signal into an 14.6 kilobits per second encoded signal which is transmitted over the radio channel. The 14.6 kilobit per second is decoded when it is received to reconstruct a 64 kilobits per second signal with virtually no perceptible loss in signal quality.

Underlying the mechanics of RELP is a recursive encoding and decoding formulation which relies upon the harmonics of the human voice which provide statistically predictable wave patterns. Unlike voice transmissions, however, data communication signals, such as modem and fax (telecopier) signals, do not exhibit the harmonic qualities which are characteristic of voice signals. Accordingly, the RELP signal compression technique which is employed for voice signals is not entirely suitable for fax and modem communication signals. It would be desirable to provide a more suitable coding compression system for data signals.

SUMMARY AND OBJECTS OF THE INVENTION

A radio telephone system is provided which includes means for encoding the signal to compress it to facilitate increased communications capacity by permitting time division multiplexing of radio telephone signals. The system is characterized in its identification of the type of communication signals, such as between voice, fax or modem, and the utilization of different compression methods according to the type of communication signal. An improved method of compressing both fax and modem signals is provided.

An object of the present invention is to provide a radio telephone system which is transparent to the user irrespective of the telecommunication of voice, fax or data. It is a further object the invention to provide an improved data signal compression method.

Other objects and advantages of the invention will be apparent from the following description of a presently preferred embodiment.

DETAILED DESCRIPTION OF A PRESENTLY PREFERRED EMBODIMENT

Figure 1:
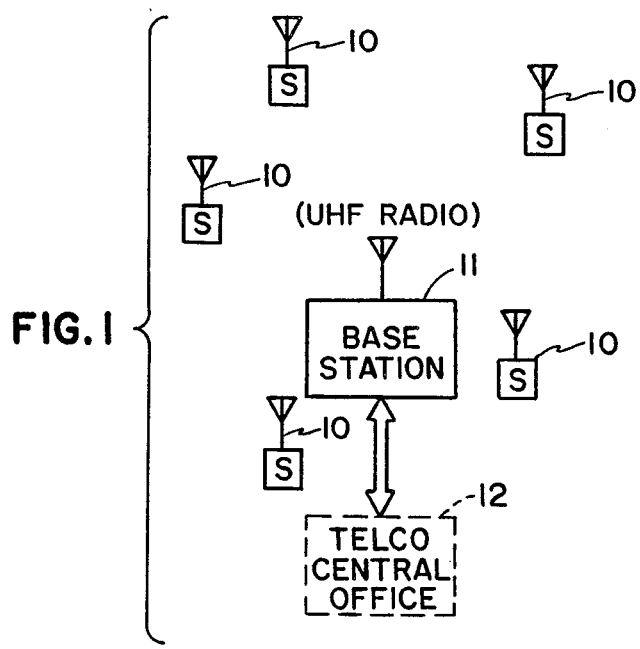
FIG. 1 is a schematic diagram of a radio telecommunication system which can utilize the improved data compression processing in accordance with the teachings of the present invention.

Referring to FIG. 1, there is shown schematically a base station 11 and a plurality of subscriber stations 10 of a radio telephone system network. The base station 11 is designed to communicate with a number of the subscriber stations 10 simultaneously through the broadcast and reception of radio waves over selected frequencies. The base station is also interfaced with telephone company (TELCO) trunk lines 12. The subscriber units 10 may be stationary such as to provide telephone service to remote areas where the construction of telephone lines is physically impractical and/or cost prohibitive. Alternatively, the subscriber stations 10 may be mobile units such as a car phone.

A typical system may utilize 26 predetermined channels in the 450 megahertz spectral region. The number of channels is generally limited due to governmental allocation of selected portions of the radio spectrum for radio telephone communications. For example, the Federal Communication Commission (FCC) provides specific regulations in this regard in the United States.

Base station-subscriber station communication is generally performed over pairs of frequency channels within the designated spectral band. Preferably the base station transmits signals on the lower of the two frequencies in each pair and receives signals from the subscriber station on the higher of the two frequencies of each pair. In a system where 26 frequency channels are available, the base station is designed to simultaneously transmit and receive signals over 13 different channel pairs.

In order to increase the capacity of such a radio, telephone system, time division multiplexing of communication signals has been utilized. For example, in the radio telephone communication systems disclosed in U.S. Pat. No. 4,675,863, issued June 23, 1987, entitled SUBSCRIBER RF TELEPHONE SYSTEM FOR PROVIDING MULTIPLE SPEECH AND/OR DATA SIGNALS SIMULTANEOUSLY OVER EITHER A SINGLE OR A PLURALITY OF RF CHANNELS (Wilson et al.), which is hereby incorporated by reference as if fully set forth, a telephone system is disclosed which permits up to four communication signals to be communicated over a single pair of radio channels.

Accordingly, each channel pair is divided into four time slots such that the base station can be simultaneously communicating with four different subscriber stations over a single channel pair. This effectively increases the capacity of the radio telephone system four fold so that over 50 telecommunication signals can be simultaneously communicated over the 13 channel pair radio system. In practice, one of the 52 time slots defined in the 13 channel pairs is reserved for performing system overhead functions, such as the assignment of channels and time slots for the specific telecommunication signals being communicated with selected subscriber stations. Such a time division multiplexing radio telephone system can easily provide normal telephone service for 500 or more subscriber stations.

One such radio telecommunication system which operates using time division multiplexing is the Ultraphone TM system commercially available from the International Mobile Machines, Incorporated, the assignee of the present invention.

In order to effectuate the increased communication capacity of the radio channel pairs through time division multiplexing, the standard communication signals between subscribers are compressed to fit within the time slot accorded by the time division multiplex system. For example, with reference to U.S. Pat. No. 4,687,863, noted above, a typical digitized communication signal of a 64 kilobits per second is compressed into an encoded signal of approximately 14.6 kilobits per second.

In practice a standard analog telecommunication signal is initially converted into a 64 kilobits per second digital signal. Preferably, the signal is converted into an eight bit byte signal thereby producing an 8 kilobyte per second digital signal.

In the above-referenced conventional system, the communication signal is processed in increments of 22.5 microseconds. This results in 180 byte samples of the 8 kilobyte per second digital communication signal being processed in each successive frame of the radio telephone system channel. The time division multiplex frame for each channel pair is designed to accommodate a 14.6 kilobit per second encoded signal. For a given 22.5 millisecond frame, this is equivalent to 41 eight bit bytes of information per frame. Accordingly, for each frame, the information contained in the 180 byte samples must be encoded into no more than 41 bytes for transmission in one of the time slots of a selected frequency channel. Moreover, the encoded 41 bytes must, upon reception at the receiving station, be reconstructed into 180 byte samples for each frame without perceptible distortion or loss of information contained in the communication signal.

For voice transmissions, it is known to utilize a Residual Excited Linear Predictive encoding system (RELP) to process a 180 byte sample into a 41 byte encoded signal which is capable of being reconstructed into an acceptable equivalent 180 byte sample. The RELP encoding system relies upon the use of certain inherent pitch characteristics of a voice signal. Such an encoding system is referenced in U.S. Pat. No. 4,675,863 and is described in detail in U.S. patent application Ser. No. 667,444, filed Nov. 2, 1984, entitled RELP VOCODER IMPLEMENTED IN DIGITAL SIGNAL PROCESSORS (Wilson et al.), PCT International Publication No. WO 86/02726, published May 9, 1986, which patent application is hereby incorporated by reference as if fully set forth.

While RELP encoding has proven satisfactory for voice signals it is not entirely suitable for the encoding of fax (telecopy) and/or modem communication signals. These signals do not exhibit the harmonic and pitch characteristics of a voice signal. Accordingly, the underlying recursive algorithms upon which RELP is based do not adequately facilitate the encoding of such signals. Nevertheless, the hardware processors suitable for RELP data compression are suitable for the compression technique of the present invention. For example, the Texas Instrument Model TMS 32020 Digital Signal Processor is preferred for the implementation of the instant compression process.

Figure 2:
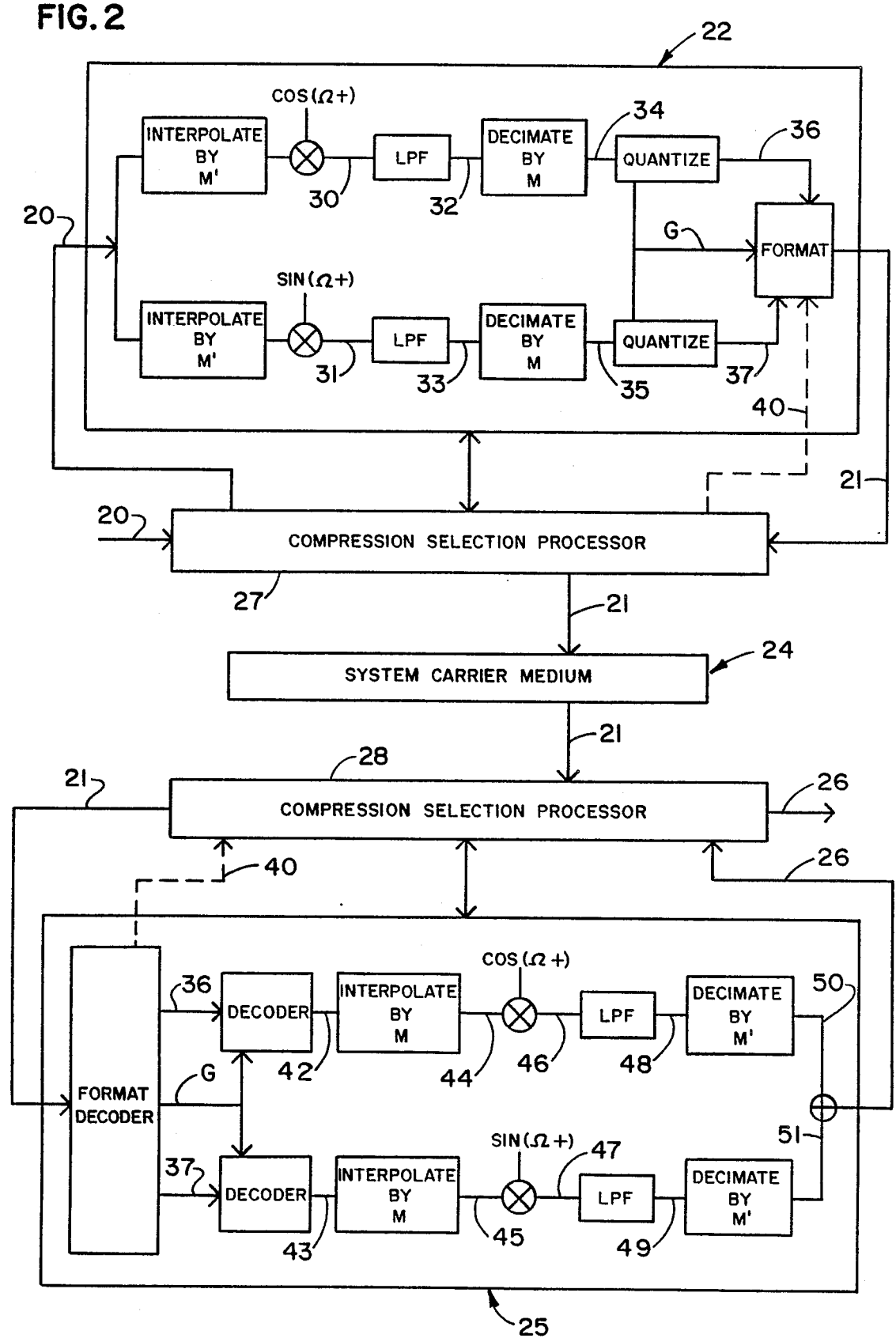
FIG. 2 is a diagrammatic illustration of the data compression and decoding of communication signals in accordance with the teachings of the present invention.

In order to improve the transmission of fax and modem signals in such radio telephone communication systems, an improved coding technique and implementation system therefor has been devised. With reference to FIG. 2, there is shown schematically applicant's inventive encoding and decoding system for communication signals, particularly fax and data signals.

The processing of the communication signal from its standard analog form into a digital 64 kilobits per second (8 kilobytes per second) digital signal for processing in 180 byte samples per frame is standardized within the overall radio telecommunication system for the processing of all communication signals. When fax and/or data signals are being communicated, the 8 kilobyte per second digital signal 20 is encoded into a selectively formatted coded signal 21 by a coding processor 22. The coded signal 21 is transmitted in a selected time slot of one of the systems radio channels 24 which each contain several slots defined by time division multiplexing. The receiving station includes a decoding processor 25. The encoded signal 21 is directed to the decoder 25 for processing to reconstruct a communication signal 26 which is substantially equivalent to the original signal 20. Both the transmitting station and the receiving station include a compression selector processor 27, 28 which coordinates the respective encoding and/or decoding activity as discussed below with respect to FIG. 7. In practice, each station includes both an encoder 22 and a decoder 25 for duplex station-station-communication. Moreover, the compression selector processor, encoder and decoder may all be implemented in a single micro processor such as a Texas Instrument Model TMS 32020 Digital Signal Processor.

The encoding processor 22 first interpolates the communication signal 20 by a selected factor M' to increase the sample size. The augmented sample is then split into its in-phase and quadrature components 30, 31 through the multiplication by the $\cos(\Omega t)$ and $\sin(\Omega t)$, respectively. This results in the simultaneous processing of two bit streams of information 30, 31. $\Omega$ is chosen as the approximate center frequency of the frequency domain representation of the signal. The mixing by $\cos(\Omega t)$ and $\sin(\Omega t)$ respectively, displaces the center of the frequency domain of the communication signal from $\Omega$ to 0Hz.

After mixing, each respective signal 30, 31 is low passed filtered to remove frequency components over a selected level in the frequency domain. This eliminates distortion and echo frequency components centered on even multiples of $\Omega$.

Each filtered sample 32, 33 is then decimated by a selected factor M to reduce the sample size for quantization. The decimated signal 34, 35 for both the in-phase and quadrature components are then quantized into a selected number of levels with an adaptive pulse code modulator coder which results in quantized signal samples 36, 37 and a quantization gain component G. The respective quantized signal samples and gain component, along with a unique word 40, are then formatted into the encoded signal 21 which has a selected frame structure. Although separate gain components may be generated for the in-phase and quadrature components, a common gain value of the most significant eight bits is satisfactory for the compression of the 8 kilobyte per second signal into an encoded 14.6 kilobit per second signal.

The frame structure conforms with the format requirements of the slots allocated for communication signals in the time division multiplexed channels of the radio telephone system. In the preferred system, the frame format is 41 bytes per frame. The unique word 40 conveys the information relating to the type of signal being communicated, i.e. voice, fax, or modem, and timing information. In the receiver, the received encoded frame is processed in accordance with this information.

The decoding processor 25 of the receiving station separates the quantized signal samples 36, 37 and quantization gain G for the respective in-phase and quadrature components. Decoding of the quantized signals 36, 37 is then performed in accordance with the quantization gain parameter G resulting in communication signal samples 42, 43 which are informationally equivalent to the pre-quantized, decimated samples 34, 35. Thereafter the signal samples 42, 43 for both in-phase and quadrature components are successively interpolated by the factor M.

The interpolated in-phase signal 44 is then again mixed with $\cos(\Omega t)$ and the interpolated quadrature signal 45 is then again mixed with $\sin(\Omega t)$. Both signals 46, 47 are then low pass filtered at the same level for which filtering was conducted following the initial mixing of the signals. Each filtered signal 48, 49 is decimated by the factor M' and the two signals are summed to reconstruct a communication signal 26 equivalent to the initial 8 kilobyte signal 20. Although it is possible to synchronize the encoding and decoding processes, synchronization is not required.

In the preferred embodiment, compatible with the system disclosed in U.S. Pat. No. 4,675,863, when encoding of the digitized 8 kilobyte per second communication signal 20, the encoding processor 22 encodes a 180 byte sample into a 41 byte frame structure for time division multiplex transmission over a selected radio telephone system channel.

Figure 4:
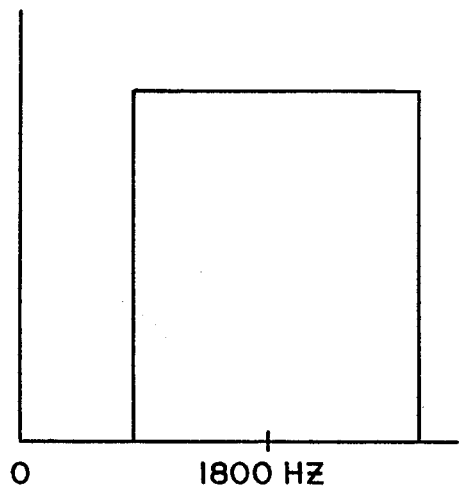
FIG. 4 is a graphic illustration of the frequency domain of a typical fax communication signal.
Figure 3:
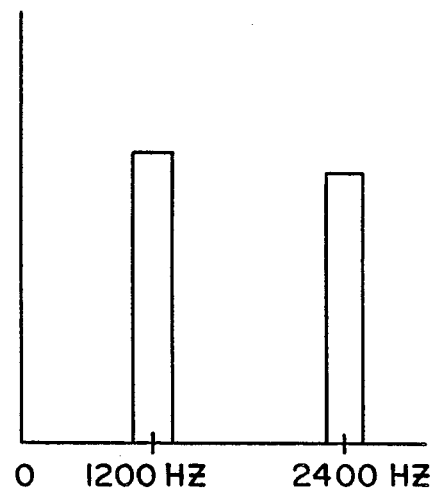
FIG. 3 is a graphic illustration of the frequency domain of a split band modem communication signal.

As illustrated in FIG. 3, split band modem communication signals are relatively narrowly centered about either 1200 hertz (representing data transmission from the originating modem) or 2400 hertz (representing data transmission from the answering modem). Fax communication signals are typically centered about 1800 hertz in a broader range as illustrated in FIG. 4.

Preferably when a fax signal is being communicated, the signal is interpolated by a factor of three, thereby increasing the frame sample size to 540 samples per frame. Mixing is then effectuated for in-phase and quadrature components by $\cos(1800t)$ and $\sin(1800t)$, respectively. Low pass filtering is performed to eliminate frequencies higher than 1400 hertz. The respective in-phase and quadrature components 32, 33 are then decimated by a factor of 10 resulting in a reduction in a sample size to 54 samples for each component of the frame.

The in-phase and quadrature samples 34, 35 are then quantized into 6 levels with an adaptive pulse code modulation coder resulting in the quantized representation of the samples 36, 37 and a quantization gain factor G of 8 bits. The encoded quantized representations of the respective 54 byte samples per frame of each component are encoded into an eight bit bytes which each represent a group of three quantized signal samples. Thus the 54 samples of the respective components remaining after decimation are represented by 18 bytes which each represent quantized value of three of the 54 samples and the 8 bit gain factor G.

Figure 5:
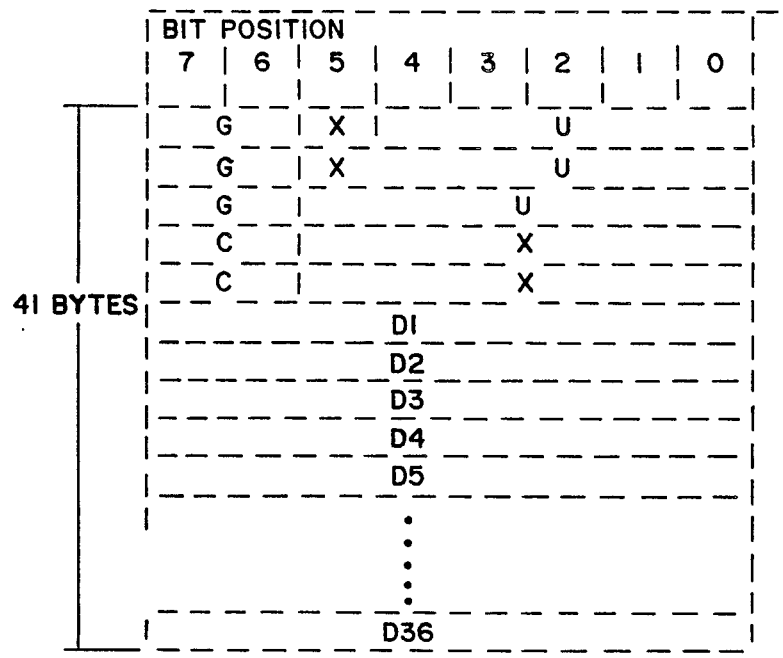
FIG. 5 is a diagrammatic illustration of the frame structure utilized in transmitting a compressed fax signal in accordance with the teachings of the present invention.

Accordingly a total of 36 eight bit bytes D1-D36 and the 8 bit gain factor G are formatted into a 41 byte frame for data transmission by the radio telecommunication system such as depicted in FIG. 5. The 16 bit unique word U, a 4 bit error checking code C and 12 unused bits X fill out the frame to total the 41 bytes.

After the frame is transmitted and received over the carrier medium, the formatted frame is then decoded separating the 8 bit gain factor G and the 18 in-phase and 18 quadrature quantized bytes. The quantized signals 36, 37 are then respectively decoded in accordance with the quantization gain factor G resulting in 54 eight bit samples 42, 43 which contain information essentially equivalent to the prequantized, decimated in-phase and quadrature signals 34, 35, respectively.

The decoded in-phase and quadrature samples 42, 43, respectively, are then interpolated by a factor of 10 to increase the sample size to 540. The resulting signal 44 of the in-phase component is then mixed with cos(1800t). Similarly the quadrature component 45 is mixed with sin(1800t). The samples 46, 47 are then low pass filtered to remove frequency domain components above 1400 hertz. Thereafter, the resultant in-phase and quadrature components 48, 49 are each decimated by a factor of 3 to reduce the sample size to 180 eight bit samples in the frame. Finally, the signals 50, 51 are summed to produce a communication signal 26 which is substantially equivalent to the initial 8 kilobyte per second signal 20.

For modem transmission, the parameters used for data compression are slightly different. As with fax signals each 180 byte per frame digital signals is interpolated by a factor of 3 to increase the sample size to 540. The mixing of the signal into in-phase and quadrature components by $\cos(\Omega t)$ and $\sin(\Omega t)$, respectively is performed with $\Omega$ equal to either 1200 hertz or 2400 hertz depending upon whether the signal is emanating from the originating or answering modem.

Low pass filtering is applied with a cut off frequency of 700 hertz. The lower level of low pass filtering for modem signals, in comparison to fax signals, is due to the relatively narrow band width of the frequency domain of the modem signal about 1200 and 2400 hertz.

Figure 6:
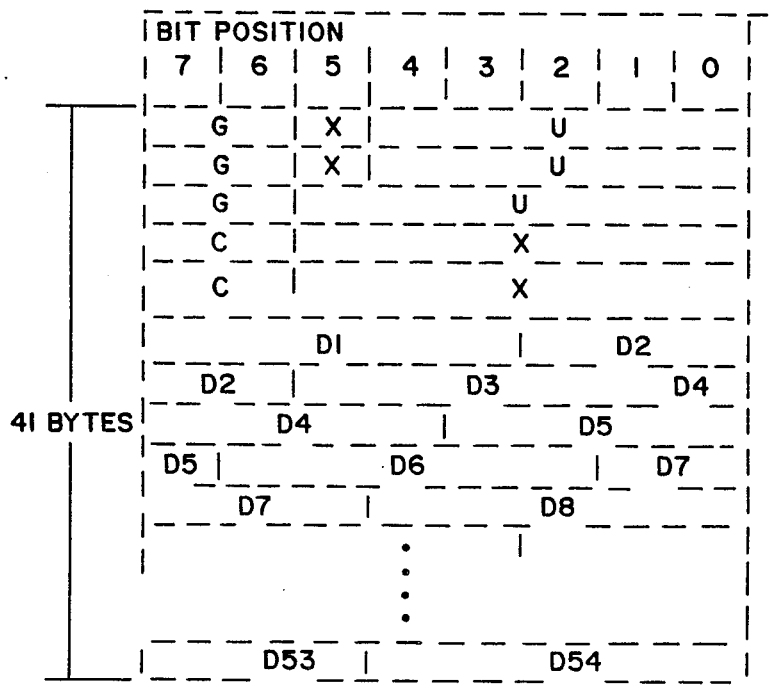
FIG. 6 is a diagrammatic illustration of the frame structure utilized in transmitting a compressed modem signal in accordance with the teachings of the present invention.

After filtering, the signal is decimated by a factor of 20 to reduce samples to 27 samples per frame. The respective in-phase quadrature samples are quantized into 32 levels with an adaptive PCM coder. This results in 27 five bit quantized representations D1-D54 of the decimated samples for each of the respective in-phase and quadrature components along with an 8 bit quantization gain factor G. This information along with the 16 bit unique word U, a four bit error checking code C, and 12 unused bits X, is formatted into a 41 byte frame structure for transmission in the selected time slot of the selected frequency channel pair over which radio telecommunications is being conducted. FIG. 6 represents the frame structure for such data communication. Note that preferably the unique word U is always formatted in the same position irrespective of signal type.

In the receiving end, the received 41 byte frame is separated into the respective 27 five bit quantized samples for the in-phase and quadrature components and 8 bit quantization gain G. The encoded five bit quantized samples are decoded in accordance with the quantization gain factor G to result in 27 eight bit signal samples which are informationally equivalent of the decimated in-phase and quadrature signal components, respectively. The decoded samples are interpolated by a factor of 20 to result in 540 samples per frame. These samples are again mixed with $\cos(\Omega t)$ and $\sin(\Omega t)$, respectively, and then low pass filtered using the same filter level (700 Hz) as in the transmitter. Thereafter the mixed and filtered decoded signals 48, 49 are decimated by a factor of 3 to result in 180 samples per frame. The two signals 50, 51 are then summed to produce the 8 kilobyte per second communication signal 26 which is informationally equivalent to the original signal 20.

The unique word 40 is utilized to indicate the type of signal being processed so that the system uses the appropriate compression method and associated parameters with the particular signal. For example the unique word will indicate whether the communication signal is to be processed as voice, fax, modem origination, or modem answer signals.

Figure 7:
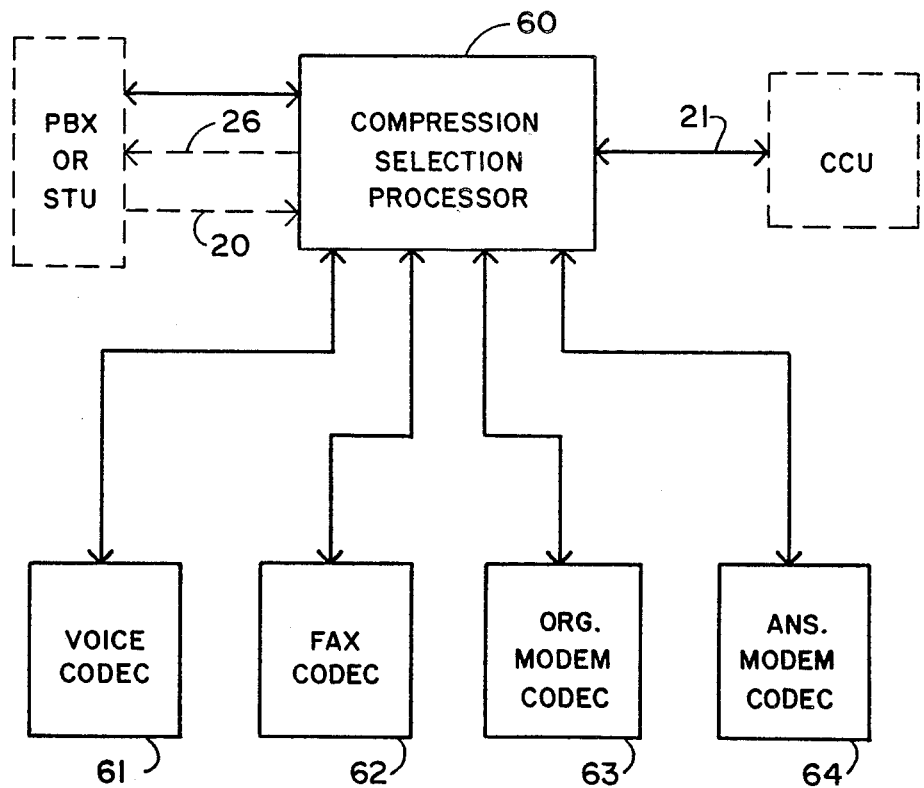
FIG. 7 is a diagrammatic illustration of the implementation of the improved coding system within a radio telecommunication system.

A prior art radio telecommunication system, such as described in U.S. Pat. No. 4,675,863, can be readily modified to utilize the inventive compression method. FIG. 7, schematically depicts the modification which entails the substitution of a compression selection processor (CSP) 60 and associated coding/decoding processors (CODECs) 61, 62, 63, 64 for each voice coder/decoder (CODEC) in the prior art system.

Generally, the CSP 60 utilizes only one of the CODEC's 61-64 at a time. Accordingly, all CODEC's may be embodied in a single microchip with the CSP controlling the parameters and method of encoding to be used for any given communication signal. In fact, all of the processors 60-64 can be integrated into a Texas Instrument Model TMS 32020 Digital Signal Processor to implement both the coding selection and the appropriate coding and decoding processes.

Preferably, in the compression processing of communication signals, the radio telecommunications system utilizes a desired voice signal compression method such as RELP, as a default state. This is preferred since a standard echo cancellor disable tone at either 2225 or 2100 Hz is generated at the initiation of fax and modem transmission.

The compression selection processor 60 monitors the communication signal 20, which is being processed by the voice CODEC 61, to check for an echo canceller disabled tone. This is done by checking the first two reflection coefficients of each frame. If these coefficients are in a specified range for a sufficient number of frames, the system switches from voice processing to processing the communication signal in accordance with the data compression technique of the present invention in the fax and modem CODECs 62-64.

After switching from the voice state, the system initially processes the communication signals with the fax CODEC 62 in accordance with the parameters for fax signal transmission discussed above. The communication signal 20 is then monitored to detect the presence of fax signaling. Specifically, the detection is performed by exploiting the presence of a 300 bit per second half duplex FSK signal (using 1650 and 1815 Hz) which is used for the initial hand shaking between fax machines.

The FSK signal is detected in the following way. A second order LPC analysis is performed on the signal which produces 2 reflection coefficients. Each reflection coefficient is averaged with the corresponding coefficient from the preceding 3 frames. If the average of the coefficients fall within the set of predetermined boundaries, fax transmission is detected and processing continues in accordance with the fax CODEC 62, i.e., with the above disclosed compression technique using fax parameters. If, however, the FSK signal is not detected within a designated window of time such as 4.725 seconds, the system begins to utilize the appropriate modem CODEC 63, 64.

Upon detection of the disabling tone and the absence of the FSK signal detection, the originating modem CODEC 63 is used. The unique word transmitted in each frame is processed by the receiving station to decode the frame as voice, fax, and modem originated or modem answer data respectively. When the receiving station detects reception of a unique word indicating an originating modem signal, the selection processor 60 of the receiving station switches to use the answering modem CODEC 64 for return signals.

In addition to monitoring the transmit direction communication signal 20 for fax signaling, the processor 60 also monitors the energy in the transmit direction. If energy disappears from the transmit direction for a predefined interval, such as 67.5 milliseconds for modem signals and 22.5 seconds for fax signals, the processor notes this and the system returns to its default state, processing the communication signal as a voice signal with the voice CODEC 61. Irrespective of whether the FSK signal is detected, the energy in the transmit direction is continually monitored to determine the end of fax and/or modem signaling to reset the system to voice signaling.

Although the present data compression method has been described in conjunction with a specific radio telecommunication system in a presently preferred embodiment, it can be readily adapted to other systems where parameters, frequencies, carrier medium, frame timing and structure are varied. Additionally the parameters utilized in the data compression method have been determined with reference to compatibility with the systems disclosed in U.S. Pat. No. 4,675,863. It is possible to formulate other sets of parameters which will effectively enable the compression of the communication signal in accordance with the disclosed invention which can be decoded into informationally equivalent data signals in accordance with the disclosed methods.

What is claimed is:

1. In a telecommunication system for communicating communication signals between various locations over a selected carrier medium wherein the communication signal is compressed to facilitate its transmission over the selected carrier medium and the communication signal is reconstructed after reception, an improved encoding method comprising:
    transforming the communication signal into two separate components including:
        determining the approximate center frequency $\Omega$ of the communication signal,
        mixing the communication signal with $\cos(\Omega t)$ to produce an in-phase component, and
        mixing the communication signal with $\sin(\Omega t)$ to produce a quadrature component;
    quantizing each separated signal component into a selected number of levels thereby encoding the signal components into quantized signals and an associated quantization gain parameter; and
    formatting the quantized signals and gain component to thereby produce a compressed encoded signal for transmission over the selected carrier medium of the communication system.

2. An encoding method according to claim 1 further comprising:
    filtering each of the in-phase and quadrature components prior to quantizing to remove from each component's frequency domain all frequencies above a selected level.

3. An encoding method according to claim 2 further comprising:
    decimating the respective filtered in-phase and quadrature components by a selected factor M prior to quantizing.

4. An encoding method according to claim 3 further comprising:
    interpolating the communication signal by a selected factor M' prior to mixing the communication signal with $\cos(\Omega t)$ and $\sin(\Omega t)$ to produce respective in-phase and quadrature components.

5. An encoding method according to claim 4 wherein:
    the approximate center frequency $\Omega$ of the communication signal is determined by determining the type of communication signal and assigning a preselected value $\Omega$ to based upon the type of signal.

6. An encoding method according to claim 5 wherein:
    the preselected value assigned to $\Omega$ is 1800, M is selected to be 20, M' is selected to be 3, the filtering level is selected to be 1400 Hz and the in-phase and quadrature components are quantized into 6 levels when the communication signal is determined to be a fax signal;
    the preselected value assigned to $\Omega$ is 1200, M is selected to be 10, M' is selected to be 3, the filtering level is selected to be 700 Hz and the in-phase and quadrature components are quantized into 32 levels when the communication signal is determined to be an originating band signal of a split band modem signal; and
    the preselected value assigned to $\Omega$ is 2400, M is selected to be 10, M' is selected to be 3, the filtering level is selected to be 700 Hz and the in-phase and quadrature components are quantized into 32 levels when the communication signal is determined to be an answering band signal of a split band modem signal.

7. In a telecommunication system for communicating communication signals between various locations over a selected carrier medium wherein the communication signal is compressed to facilitate its transmission over the selected carrier medium and the communication signal is reconstructed after reception, an improved method of encoding fax signals comprising:
    transforming the fax signal into two separate components including:
        mixing the fax signal with $\cos(1800t)$ to produce an in-phase component, and
        mixing the fax signal with $\sin(1800t)$ to produce a quadrature component;
    quantizing each separated signal component into a selected number of levels thereby encoding the signal components into quantized signals and an associated quantization gain parameter; and
    formatting the quantized signals and gain component to thereby produce a compressed encoded signal for transmission over the selected carrier medium of the communication system.

8. An encoding method according to claim 7 further comprising:
filtering each of the in-phase and quadrature components prior to quantizing to remove from each component's frequency domain all frequencies above 1400 Hz.

9. An encoding method according to claim 8 further comprising:
interpolating the fax signal by a factor of 3 prior to mixing the fax signal to produce in-phase and quadrature components; and
decimating the respective filtered in-phase and quadrature components by a factor of 10 prior to quantizing.

10. An encoding method according to claim 9 wherein the in-phase and quadrature components are quantized into 6 levels.

11. In a telecommunication system for communicating communication signals between various locations over a selected carrier medium wherein the communication signal is compressed to facilitate its transmission over the selected carrier medium and the communication signal is reconstructed after reception, an improved method of encoding split band modem signals comprising:
transforming the modem signal into two separate components including:
determining the band of the modem signal,
mixing the modem signal with $\cos(\Omega t)$ to produce an in-phase component and mixing the modem signal with $\sin(\Omega t)$ to produce a quadrature component where $\Omega$ is 1200 for an originating band signal and $\Omega$ is 2400 for an answering band signal;
quantizing each separated signal component into a selected number of levels thereby encoding the signal components into quantized signals and an associated quantization gain parameter; and
formatting the quantized signals and gain component to thereby produce a compressed encoded signal for transmission over the selected carrier medium of the communication system.

12. An encoding method according to claim 11 further comprising:
filtering each of the in-phase and quadrature components prior to quantizing to remove from each component's frequency domain all frequencies above 700 Hz.

13. An encoding method according to claim 12 further comprising:
interpolating the modem signal by a factor of 3 prior to mixing the modem signal to produce in-phase and quadrature components; and
decimating the respective filtered in-phase and quadrature components by a factor of 20 prior to quantizing.

14. An encoding method according to claim 11 wherein the in-phase and quadrature components are quantized into 32 levels.

15. In a telecommunication system for communicating communication signals between various locations over a selected carrier medium wherein the communication signal is compressed into a selectively formatted encoded signal comprised of quantized in-phase and quadrature signals and a gain component to facilitate its transmission over the selected carrier medium and the communication signal is reconstructed after reception, an improved decoding method comprising:
separating the quantized in-phase and quadrature signals and gain component of a compressed encoded signal received over the selected carrier medium of the communication system;
determining the approximate center frequency $\Omega$ of the communication signal being decoded;
reconstructing the respective in-phase and quadrature signals by quantize decoding in accordance with the gain component;
mixing the reconstructed in-phase signal with $\cos(\Omega t)$;
mixing the reconstructed quadrature signal with $\sin(\Omega t)$; and
summing the two mixed, reconstructed signals to reproduce the decoded, decompressed communication signal.

16. A decoding method according to claim 15 wherein:
the approximate center frequency $\Omega$ of the communication signal is determined by determining the type of communication signal and assigning a preselected value to $\Omega$ based upon the type of signal.

17. A decoding method according to claim 16 wherein:
the preselected value assigned to $\Omega$ is 1800 when the communication signal is determined to be a fax signal;
the preselected value assigned to $\Omega$ is 1200 when the communication signal is determined to be an originating band signal of a split band modem signal; and
the preselected value assigned to $\Omega$ is 2400 when the communication signal is determined to be an answering band signal of a split band modem signal.

18. In a telecommunication system for communicating communication signals between various locations over a selected carrier medium wherein the communication signal is compressed into a selectively formatted encoded signal comprised of quantized in-phase and quadrature signals and a gain component to facilitate its transmission over the selected carrier medium and the communication signal is reconstructed after reception, an improved method of decoding compressed encoded fax signals comprising:
separating the quantized in-phase and quadrature signals and gain component of a compressed encoded fax signal received over the selected carrier medium of the communication system;
reconstructing the respective in-phase and quadrature signals by quantize decoding in accordance with the gain component;
mixing the reconstructed in-phase signal with $\cos(1800t)$;
mixing the reconstructed quadrature signal with $\sin(1800t)$; and
summing the two mixed, reconstructed signals to reproduce the decoded, decompressed fax signal.

19. In a telecommunication system for communicating communication signals between various locations over a selected carrier medium wherein the communication signal is compressed into a selectively formatted encoded signal comprised of quantized in-phase and quadrature signals and a gain component to facilitate its transmission over the selected carrier medium and the communication signal is reconstructed after reception, an improved method of decoding compressed encoded modem signals comprising:

separating the quantized in-phase and quadrature signals and gain component of a compressed encoded modem signal received over the selected carrier medium of the communication system;

reconstructing the respective in-phase and quadrature signals by quantize decoding in accordance with the gain component;

determining the band of the modem signal, mixing the reconstructed in-phase signal with $\cos(\Omega t)$ and mixing the reconstructed quadrature signal with $\sin(\Omega t)$ where $\Omega$ is 1200 for an originating band signal and $\Omega$ is 2400 for an answering band signal; and summing the two mixed, reconstructed signals to reproduce the decoded, decompressed modem signal.

20. In a telecommunication system for communicating communication signals between various locations over a selected carrier medium wherein the communication signal is compressed to facilitate its transmission over the selected carrier medium and the communication signal is reconstructed after reception, an improved communication method comprising:

transforming the communication signal into two separate components including:

determining the approximate center frequency $\Omega$ of the communication signal, mixing the communication signal with $\cos(\Omega t)$ to produce an in-phase component, and mixing the communication signal with $\sin(\Omega t)$ to produce a quadrature component;

quantizing each separated signal component into a selected number of levels thereby encoding the signal components into quantized signals and an associated quantization gain parameter;

formatting the quantized signals and gain component to thereby produce a compressed encoded signal;

transmitting the compressed encoded signal over the selected carrier medium of the communication system;

separating the quantized in-phase and quadrature signals and gain component of the compressed encoded signal received over the selected carrier medium of the communication system;

reconstructing the respective in-phase and quadrature signals by quantize decoding in accordance with the gain component;

mixing the reconstructed in-phase signal with $\cos(\Omega t)$;

mixing the reconstructed quadrature signal with $\sin(\Omega t)$; and summing the two mixed, reconstructed signals to reproduce the decoded, decompressed communication signal.

21. A method according to claim 20 further comprising:

filtering each of the in-phase and quadrature components prior to quantizing to remove from each component's frequency domain all frequencies above a selected level; and filtering each of the mixed, reconstructed signals prior to summing to remove from each component's frequency domain all frequencies above said selected filtering level.

22. A method according to claim 21 further comprising:

decimating the respective filtered in-phase and quadrature components by a selected factor M prior to quantizing; and interpolating the reconstructed in-phase and quadrature signals by M prior to mixing.

23. A method according to claim 22 further comprising:

interpolating the communication signal by a selected factor M' prior to mixing the communication signal with $\cos(\Omega t)$ and $\sin(\Omega t)$ to produce respective in-phase and quadrature components; and decimating the respective mixed and filtered reconstructed in-phase and quadrature signals by M' prior to summing.

24. A method according to claim 23 wherein:

the approximate center frequency $\Omega$ of the communication signal is determined by determining the type of communication signal and assigning a preselected value to $\Omega$ based upon the type of signal.

25. A method according to claim 24 wherein:

the preselected value assigned to $\Omega$ is 1800, M is selected to be 20, M' is selected to be 3, the filtering level is selected to be 1400 Hz and the in-phase and quadrature components are quantized into 6 levels when the communication signal is determined to be a fax signal;

the preselected value assigned to $\Omega$ is 1200, M is selected to be 10, M' is selected to be 3, the filtering level is selected to be 700 Hz and the in-phase and quadrature components are quantized into 32 levels when the communication signal is determined to be an originating band signal of a split band modem signal; and the preselected value assigned to $\Omega$ is 2400, M is selected to be 10, M' is selected to be 3, the filtering level is selected to be 700 Hz and the in-phase and quadrature components are quantized into 32 levels when the communication signal is determined to be an answering band signal of a split band modem signal.

26. A signal compression encoder for a telecommunication system for communicating communication signals between various locations over a selected carrier medium wherein the communication signal is compressed to facilitate its transmission over the selected carrier medium and the communication signal is reconstructed after reception, the encoder comprising:

means for transforming a communication signal into two separate components including:

means for determining the approximate center frequency $\Omega$ of the communication signal, means for mixing the communication signal with $\cos(\Omega t)$ to produce an in-phase component, and means for mixing the communication signal with $\sin(\Omega t)$ to produce a quadrature component;

means for quantizing each separated signal component into a selected number of levels thereby encoding the signal components into quantized signals and an associated quantization gain parameter formatting means for multiplexing the quantized signals and gain component to thereby produce a compressed encoded signal for transmission over the selected carrier medium of the communication system.

27. An encoder according to claim 26 further comprising:

means for filtering each of the in-phase and quadrature components prior to quantizing to remove from each component's frequency domain all frequencies above a selected level.

28. An encoder according to claim 27 further comprising:
means for decimating the respective filtered in-phase and quadrature components by a selected factor M prior to quantizing.

29. An encoder according to claim 28 further comprising:
means for interpolating the communication signal by a selected factor M' prior to mixing the communication signal with cos($\Omega$t) and sin($\Omega$t) to produce respective in-phase and quadrature components.

30. An encoder according to claim 29 wherein:
said means for determining the approximate center frequency $\Omega$ of the communication signal determines the type of communication signal and assigns preselected values to $\Omega$, M, M', the level of filtering and the number of quantization levels based upon the type of signal.

31. An encoder according to claim 30 wherein:
the preselected value assigned to $\Omega$ is 1800, to M is 20, to M' is 3, to the filtering level is 1400 Hz and to the number of quantization levels is 6 for when the communication signal is determined to be a fax signal;
the preselected value assigned to $\Omega$ is 1200, to M is 10, to M' is 3, to the filtering level is 700 Hz and to the number of quantization levels is 32 for when the communication signal is determined to be an originating band signal of a split band modem signal; and
the preselected value assigned to $\Omega$ is 2400, to M is 10, to M' is 3, to the filtering level is 700 Hz and to the number of quantization levels is 32 for when the communication signal is determined to be an originating band signal of a split band modem signal.

32. A signal decompression decoder for a telecommunication system for communicating communication signals between various locations over a selected carrier medium wherein the communication signal is compressed into a selectively formatted encoded signal comprised of quantized in-phase and quadrature signals and a gain component to facilitate its transmission over the selected carrier medium and the communication signal is reconstructed after reception, the decoder comprising:
format decoding means for separating the quantized in-phase and quadrature signals and gain component of a compressed encoded signal received over the selected carrier medium of the communication system;
means for determining the approximate center frequency $\Omega$ of the communication signal being decoded;
quantize decoding means for reconstructing the respective in-phase and quadrature signals in accordance with the gain component;
means for mixing the reconstructed in-phase signal with cos($\Omega$t);
means for mixing the reconstructed quadrature signal with sin($\Omega$t); and
means for summing the two mixed, reconstructed signals to reproduce the decoded, decompressed communication signal.

33. A decoder according to claim 32 wherein:
said means for determining the approximate center frequency $\Omega$ of the communication signal determines the type of communication signal and assigns a preselected value to $\Omega$ based upon the type of signal.

34. An encoder according to claim 33 wherein:
the preselected value assigned to $\Omega$ is 1800 when the communication signal is determined to be a fax signal;
the preselected value assigned to $\Omega$ is 1200 when the communication signal is determined to be an originating band signal of a split band modem signal; and
the preselected value assigned to $\Omega$ is 2400 when the communication signal is determined to be an answering band signal of a split band modem signal.

35. A communication station for a telecommunication system for communicating communication signals between various stations over a selected carrier medium wherein the communication signal is compressed into a selectively formatted encoded signal to facilitate its transmission over the selected carrier medium and the communication signal is reconstructed after reception, the communication station comprising: at least one signal compression encoder including:
means for transforming a communication signal into two separate components including:
means for determining the approximate center frequency $\Omega$ of the communication signal,
means for mixing the communication signal with cos($\Omega$t) to produce an in-phase component, and
means for mixing the communication signal with sin($\Omega$t) to produce a quadrature component;
means for quantizing each separated signal component into a selected number of levels thereby encoding the signal components into quantized signals and an associated quantization gain parameter
formatting means for multiplexing the quantized signals and gain component to thereby produce a compressed encoded signal for transmission over the selected carrier medium of the communication system; and
at least one signal decompression decoder including:
format decoding means for separating the quantized in-phase and quadrature signals and gain component of a compressed encoded signal received over the selected carrier medium of the communication system;
means for determining the approximate center frequency $\Omega'$ of the communication signal being decoded;
quantize decoding means for reconstructing the respective in-phase and quadrature signals in accordance with the gain component and a selected number of quantization levels;
means for mixing the reconstructed in-phase signal with cos($\Omega'$t);
means for mixing the reconstructed quadrature signal with sin($\Omega'$t); and
means for summing the two mixed, reconstructed signals to reproduce the decoded, decompressed communication signal.

36. A plurality of communication stations according to claim 35 comprising a telecommunication system wherein one of said stations is a base station.

37. A communication station according to claim 35 wherein:
said at least one signal compression encoder further comprises means for filtering each of the in-phase and quadrature components prior to quantizing to remove from each component's frequency domain all frequencies above a selected level; and said at least one signal compression decoder further comprises means for filtering each of the mixed, reconstructed signals prior to summing to remove from each component's frequency domain all frequencies above a selected filtering level.

38. A communication station according to claim 37 wherein:

said at least one signal compression encoder further comprises means for decimating the respective filtered in-phase and quadrature components by a selected factor M prior to quantizing; and said at least one signal compression decoder further comprises means for interpolating the reconstructed in-phase and quadrature signals by m prior to mixing.

39. A communication station according to claim 38 wherein:

said at least one signal compression encoder further comprises means for interpolating the communication signal by a selected factor M' prior to mixing the communication signal with $\cos(\Omega t)$ and $\sin(\Omega t)$ to produce respective in-phase and quadrature components; and said at least one signal compression decoder further comprises means for decimating the respective mixed and filtered reconstructed in-phase and quadrature signals by m' prior to summing.

40. A communication station according to claim 39 wherein:

said at least one encoder's means for determining the approximate center frequency $\Omega$ of the communication signal determines the type of communication signal and assigns preselected values to $\Omega$, M, M', the level of filtering and the number of quantization levels based upon the type of signal; and said at least one decoder's means for determining the approximate center frequency $\Omega'$ of the communication signal determines the type of communication signal and assigns preselected values to $\Omega'$, m, m', the level of filtering and the number of quantization levels based upon the type of signal.

41. A communication station according to claim 40 wherein:

the preselected value assigned to $\Omega$ is 1800, M is selected to be 20, M' is selected to be 3, the filtering level is selected to be 1400 Hz and the in-phase and quadrature components are quantized into 6 levels when the communication signal is determined by said encoder to be a fax signal;

the preselected value assigned to $\Omega$ is 1200, M is selected to be 10, M' is selected to be 3, the filtering level is selected to be 700 Hz and the in-phase and quadrature components are quantized into 32 levels when the communication signal is determined by said encoder to be an originating band signal of a split band modem signal;

the preselected value assigned to $\Omega$ is 2400, M is selected to be 10, M' is selected to be 3, the filtering level is selected to be 700 Hz and the in-phase and quadrature components are quantized into 32 levels when the communication signal is determined by said encoder to be an answering band signal of a split band modem signal;

the preselected value assigned to $\Omega'$ is 1800, m is selected to be 20, m' is selected to be 3, the filtering level is selected to be 1400 Hz and the in-phase and quadrature components are quantized into 6 levels when the communication signal is determined by said decoder to be a fax signal;

the preselected value assigned to $\Omega'$ is 1200, m is selected to be 10, m' is selected to be 3, the filtering level is selected to be 700 Hz and the in-phase and quadrature components are quantized into 32 levels when the communication signal is determined by said decoder to be an originating band signal of a split band modem signal; and the preselected value assigned to $\Omega'$ is 2400, m is selected to be 10, m' is selected to be 3, the filtering level is selected to be 700 Hz and the in-phase and quadrature components are quantized into 32 levels when the communication signal is determined by said decoder to be an answering band signal of a split band modem signal.

42. A plurality of communication stations according to claim 41 comprising a telecommunication system wherein one of said stations is a base station.

43. A communication station for a telecommunication system for communicating communication signals between various stations over a selected carrier medium wherein the communication signal is compressed into a selectively formatted encoded signal to facilitate its transmission over the selected carrier medium and the communication signal is reconstructed after reception, the communication station comprising:

a plurality of signal compression encoders and signal decompression decoders for encoding and decoding a selected type of signal;

means for selecting one of said encoders for processing a signal to be transmitted in accordance with the signal type;

means for selecting one of said decoders for processing a received signal in accordance with the signal type;

at least one of said signal compression encoders including:

means for transforming a communication signal into two separate components including:

means for mixing the communication signal with $\cos(\Omega t)$ to produce an in-phase component where $\Omega$ is a preselected value, and means for mixing the communication signal with $\sin(\Omega t)$ to produce a quadrature component;

means for quantizing each separated signal component into a selected number of levels thereby encoding the signal components into quantized signals and an associated quantization gain parameter formatting means for multiplexing the quantized signals and gain component to thereby produce a compressed encoded signal for transmission over the selected carrier medium of the communication system; and at least one of said signal decompression decoders including:

format decoding means for separating the quantized in-phase and quadrature signals and gain component of a compressed encoded signal received over the selected carrier medium of the communication system;

quantize decoding means for reconstructing the respective in-phase and quadrature signals in accordance with the gain component and a selected number of quantization levels;

means for mixing the reconstructed in-phase signal with $\cos(\Omega' t)$ where $\Omega'$ is a preselected value;

means for mixing the reconstructed quadrature signal with $\sin(\Omega' t)$; and means for summing the two mixed, reconstructed signals to reproduce the decoded, decompressed communication signal.

44. A plurality of communication stations according to claim 43 comprising a telecommunication system wherein one of said stations is a base station.

45. A communication station according to claim 43 wherein:

said at least one signal compression encoder further comprises means for filtering each of the in-phase and quadrature components prior to quantizing to remove from each component's frequency domain all frequencies above a selected level; and said at least one signal compression decoder further comprises means for filtering each of the mixed, reconstructed signals prior to summing to remove from each component's frequency domain all frequencies above a selected filtering level.

46. A communication station according to claim 45 wherein:

said at least one signal compression encoder further comprises means for decimating the respective filtered in-phase and quadrature components by a selected factor M prior to quantizing; and said at least one signal compression decoder further comprises means for interpolating the reconstructed in-phase and quadrature signals by m prior to mixing.

47. A communication station according to claim 46 wherein:

said at least one signal compression encoder further comprises means for interpolating the communication signal by a selected factor M' prior to mixing the communication signal with $\cos(\Omega t)$ and $\sin(\Omega t)$ to produce respective in-phase and quadrature components; and said at least one signal compression decoder further comprises means for decimating the respective mixed and filtered reconstructed in-phase and quadrature signals by m' prior to summing.

48. A communication station according to claim 47 wherein:

said encoder selecting means determines the type of communication signal and assigns to said at least one encoder preselected values for $\Omega$, M, M', the level of filtering and the number of quantization levels based upon the type of signal; and said decoder selecting means determines the type of communication signal and assigns to said at least one decoder preselected values for $\Omega'$, m, m', the level of filtering and the number of quantization levels based upon the type of signal.

49. A communication station according to claim 48 wherein:

the preselected value assigned to $\Omega$ is 1800, M is selected to be 20, M' is selected to be 3, the filtering level is selected to be 1400 Hz and the in-phase and quadrature components are quantized into 6 levels when the communication signal is determined by said encoder selecting means to be a fax signal;

the preselected value assigned to $\Omega$ is 1200, M is selected to be 10, M' is selected to be 3, the filtering level is selected to be 700 Hz and the in-phase and quadrature components are quantized into 32 levels when the communication signal is determined by said encoder selecting means to be an originating band signal of a split band modem signal;

the preselected value assigned to $\Omega$ is 2400, M is selected to be 10, M' is selected to be 3, the filtering level is selected to be 700 Hz and the in-phase and quadrature components are quantized into 32 levels when the communication signal is determined by said encoder selecting means to be an answering band signal of a split band modem signal;

the preselected value assigned to $\Omega'$ is 1800, m is selected to be 20, m' is selected to be 3, the filtering level is selected to be 1400 Hz and the in-phase and quadrature components are quantized into 6 levels when the communication signal is determined by said decoder selecting means to be a fax signal;

the preselected value assigned to $\Omega'$ is 1200, m is selected to be 10, m' is selected to be 3, the filtering level is selected to be 700 Hz and the in-phase and quadrature components are quantized into 32 levels when the communication signal is determined by said decoder selecting means to be an originating band signal of a split band modem signal; and the preselected value assigned to $\Omega'$ is 2400, m is selected to be 10, m' is selected to be 3, the filtering level is selected to be 700 Hz and the in-phase and quadrature components are quantized into 32 levels when the communication signal is determined by said decoder selecting means to be an answering band signal of a split band modem signal.

50. A plurality of communication stations according to claim 49 comprising a telecommunication system wherein one of said stations is a base station.

51. A telecommunication system for communicating communication signals between various stations over a selected carrier medium wherein the communication signal is compressed into a selectively formatted encoded signal to facilitate its transmission over the selected carrier medium and the communication signal is reconstructed after reception, the system comprising:

a first station having at least one signal compression encoder including:

means for transforming a communication signal into two separate components including:

means for determining the approximate center frequency $\Omega$ of the communication signal, means for mixing the communication signal with $\cos(\Omega t)$ to produce an in-phase component, and means for mixing the communication signal with $\sin(\Omega t)$ to produce a quadrature component;

means for quantizing each separated signal component into a selected number of levels thereby encoding the signal components into quantized signals and an associated quantization gain parameter formatting means for multiplexing the quantized signals and gain component to thereby produce a compressed encoded signal for transmission over the selected carrier medium of the communication system; and a second station for receiving the compressed encoded signal from said first station having at least one signal decompression decoder including:

format decoding means for separating the quantized in-phase and quadrature signals and gain component of a compressed encoded signal received over the selected carrier medium of the communication system;

means for determining the approximate center frequency $\Omega$ of the communication signal being decoded;

quantize decoding means for reconstructing the respective in-phase and quadrature signals in accordance with the gain component;

means for mixing the reconstructed in-phase signal with $\cos(\Omega t)$;

means for mixing the reconstructed quadrature signal with $\sin(\Omega t)$; and means for summing the two mixed, reconstructed signals to reproduce the decoded, decompressed communication signal.

52. A telecommunication system according to claim 51 wherein on of said stations is a base station.

53. A telecommunication system according to claim 52 wherein:

said at least one signal compression encoder further comprises means for filtering each of the in-phase and quadrature components prior to quantizing to remove from each component's frequency domain all frequencies above a selected level; and said at least one signal compression decoder further comprises means for filtering each of the mixed, reconstructed signals prior to summing to remove from each component's frequency domain all frequencies above said selected filtering level.

54. A telecommunication system according to claim 53 wherein:

said at least one signal compression encoder further comprises means for decimating the respective filtered in-phase and quadrature components by a selected factor M prior to quantizing; and said at least one signal compression decoder further comprises means for interpolating the reconstructed in-phase and quadrature signals by M prior to mixing.

55. A telecommunication system according to claim 54 wherein:

said at least one signal compression encoder further comprises means for interpolating the communication signal by a selected factor M' prior to mixing the communication signal with $\cos(\Omega t)$ and $\sin(\Omega t)$ to produce respective in-phase and quadrature components; and said at least one signal compression decoder further comprises means for decimating the respective mixed and filtered reconstructed in-phase and quadrature signals by M' prior to summing.

56. A telecommunication system according to claim 55 wherein:

said means for determining the approximate center frequency $\Omega$ of the communication signal determines the type of communication signal and assigns preselected values to $\Omega$, M, M', the level of filtering and the number of quantization levels based upon the type of signal.

57. A telecommunication system according to claim 56 wherein:

the preselected value assigned to $\Omega$ is 1800, M is selected to be 20, M' is selected to be 3, the filtering level is selected to be 1400 Hz and the in-phase and quadrature components are quantized into 6 levels when the communication signal is determined to be a fax signal;

the preselected value assigned to $\Omega$ is 1200, M is selected to be 10, M' is selected to be 3, the filtering level is selected to be 700 Hz and the in-phase and quadrature components are quantized into 32 levels when the communication signal is determined to be an originating band signal of a split band modem signal; and the preselected value assigned to $\Omega$ is 2400, M is selected to be 10, M' is selected to be 3, the filtering level is selected to be 700 Hz and the in-phase and quadrature components are quantized into 32 levels when the communication signal is determined to be an answering band signal of a split band modem signal.

* * * * *

UNITED STATES PATENT AND TRADEMARK OFFICE
CERTIFICATE OF CORRECTION

PATENT NO.  : 4,974,099
DATED       : November 27, 1990
INVENTOR(S) : Daniel Lin, et al.

It is certified that error appears in the above-identified patent and that said Letters Patent is hereby corrected as shown below:

Column 10, line 27 of claim 5, delete "$\Omega$ to" and insert therefor --to $\Omega$--

Signed and Sealed this

Tenth Day of March, 1992

Attest:

HARRY F. MANBECK, JR.

*Attesting Officer*          *Commissioner of Patents and Trademarks*